No. 727,371. PATENTED MAY 5, 1903.
H. JAARSMA.
SAFE.
APPLICATION FILED JULY 19, 1902.
NO MODEL. 2 SHEETS—SHEET 1.

Witnesses. Inventor:—
Heije Jaarsma
by Eustace W. Hopkins
Atty.

No. 727,371. PATENTED MAY 5, 1903.
H. JAARSMA.
SAFE.
APPLICATION FILED JULY 19, 1902.
NO MODEL. 2 SHEETS—SHEET 2.

Witnesses:-
K. Munter
J. Hubers

Inventor:-
Heije Jaarsma
by Eustace W. Hopkins
atty.

No. 727,371. Patented May 5, 1903.

UNITED STATES PATENT OFFICE.

HEIJE JAARSMA, OF SNEK, NETHERLANDS.

SAFE.

SPECIFICATION forming part of Letters Patent No. 727,371, dated May 5, 1903.

Application filed July 19, 1902. Serial No. 116,287. (No model.)

*To all whom it may concern:*

Be it known that I, HEIJE JAARSMA, a subject of the Queen of the Netherlands, and a resident of Snek, Kingdom of the Netherlands, have invented certain new and useful Improvements in Safes, of which the following is a description.

The present invention relates to safes; and it consists of the peculiar arrangement of the same in order to prevent the contents from getting burned and charred by fire.

In the case of very large fires even the best form of fireproof safes are liable to allow sufficient heat to penetrate to the interior of the safe to char the contents, as far as the latter consist of books or the like, so that although the metal treasure is saved there is still great danger that the books and also paper money may be burned up.

According to the present invention the class of contents of the safe above referred to are protected against burning or charring by means of a series of air-chambers formed within the walls of the safe and in communication with the outer air at the top and bottom of the safe, so that when a fire takes place currents of comparatively cold air will pass upward between the walls of the safe and so reduce the temperature within the safe that the paper or other combustible contents of the same will remain uninjured.

In order to render the present specification easily intelligible, reference is had to the accompanying drawings, in which similar letters of reference denote similar parts throughout the several views.

Figure 1:
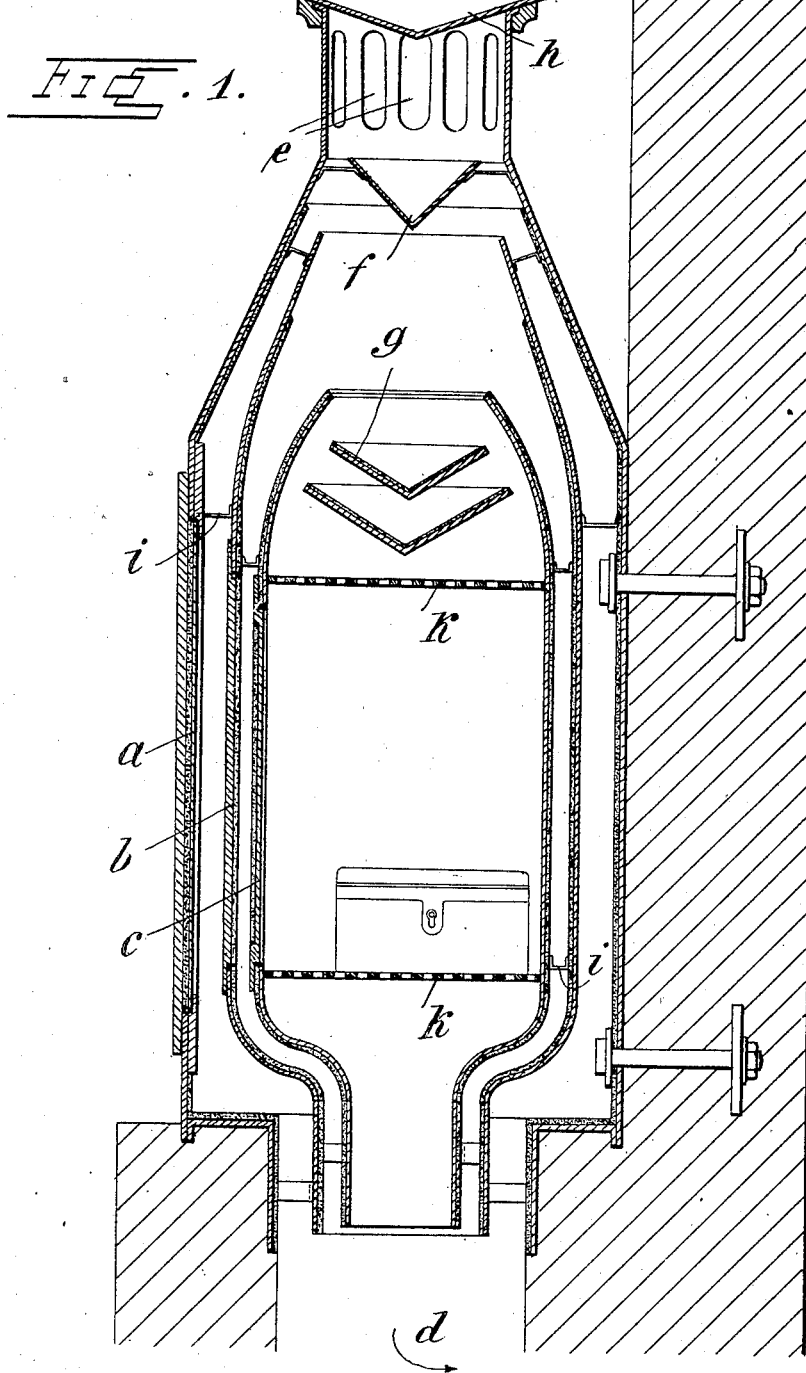
Figure 2:
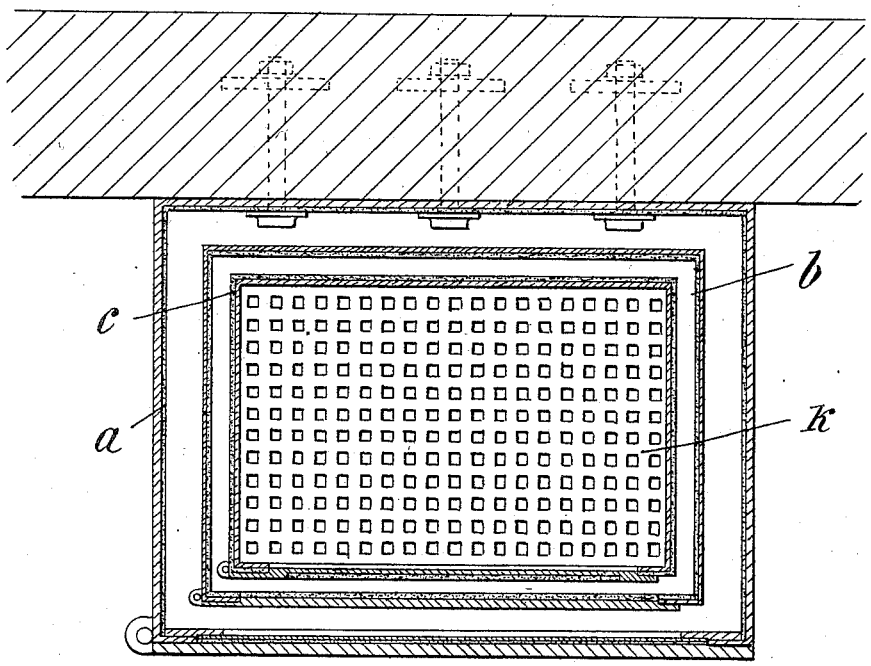

Figure 1 is a vertical section through a safe constructed according to the present invention, and Fig. 2 is a sectional plan of the same.

The body of the safe may be of the ordinary square or rectangular or other form and is advantageously provided with treble or quadruple walls $a\ b\ c$, having air-spaces between them. Instead of having a top and bottom plate, the safe is reduced in cross-section at the top and bottom and a suitable closure, as at $h$, is applied to the top, the air-holes $e$ being provided beneath the same. A baffle-plate $f$ is advantageously arranged above the interior of the safe proper and below the cover-plate, and a further series of similar baffle-plates $g$ may be provided below this plate again, so as to effectually prevent any one from gaining admission to the interior of the safe from the top. The bottom of the safe is also of reduced cross-section and is in open communication with a channel $d$, leading either through the wall into the open air or taken down under the foundations of the house or building and out into the open air. The walls $b$ and $c$ are suitably attached to the outer wall by distance-pieces $i$, and the space inclosed between the said walls is open at the top and bottom. The walls are advantageously of steel or other suitable metal lined with asbestos; but they may also be constructed with fireproof lining of other material, the present invention not being in any way limited to the particular construction of the walls nor to the outer shape or configuration of the safe as such.

The effect of the construction shown during a fire is that the safe will become intensely hot and a draft will be created, so that cold air will circulate from the bottom up through the safe and between the walls of the same, passing out at the top through the openings $e$. Thus the temperature within the safe will be much lower than that without the walls and will not in any case be high enough to char the perishable contents of the safe.

The number of walls employed may be varied at will; but three will generally be found sufficient. The construction of the door and locks, as also the general arrangement of the safe, may be of any known type and forms no part of the present invention.

I claim as my invention—

1. A safe having a series of walls with air-passages between the same, reduced cross-section at the top and bottom, a channel communicating with the open air and the lower ends of the air-passages and openings in the cover through which the air may pass out substantially as described.

2. A safe having a series of walls with intermediate air-passages, a series of openings at the top and a channel at the bottom communicating with the open air and a series of baffle-plates arranged in the upper part of the safe in the manner and for the purpose substantially as described.

In witness whereof I have hereunto set my hand in presence of two witnesses.

HEIJE JAARSMA.

Witnesses:
 HENRY HASPER,
 WOLDEMAR HAUPT.